Oct. 29, 1929.  A. BAUMANN  1,733,179
COOLING APPARATUS FOR ELECTRICAL MACHINES
Filed June 8, 1927  3 Sheets-Sheet 1
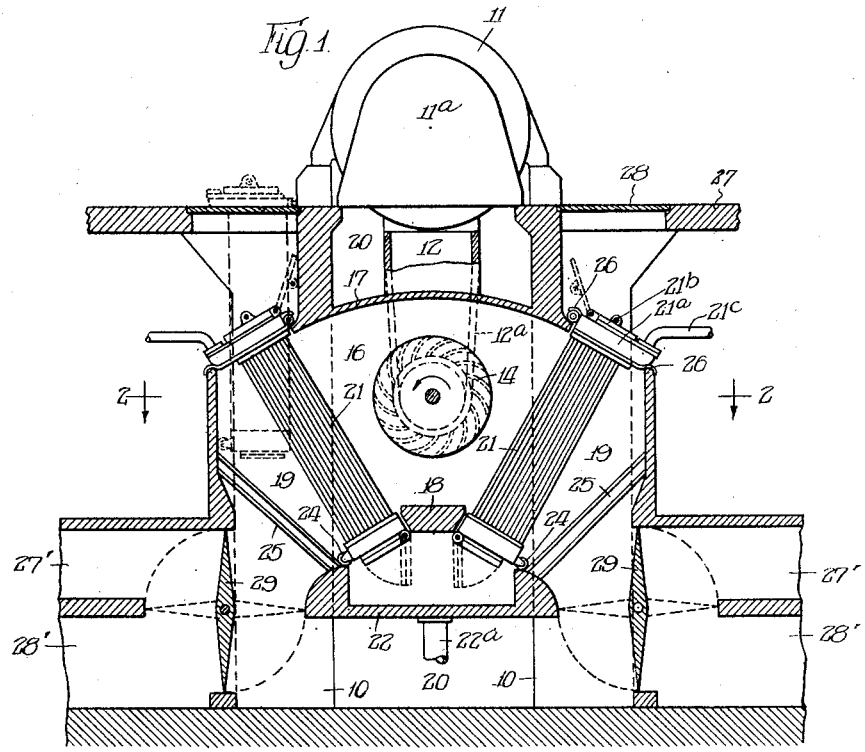
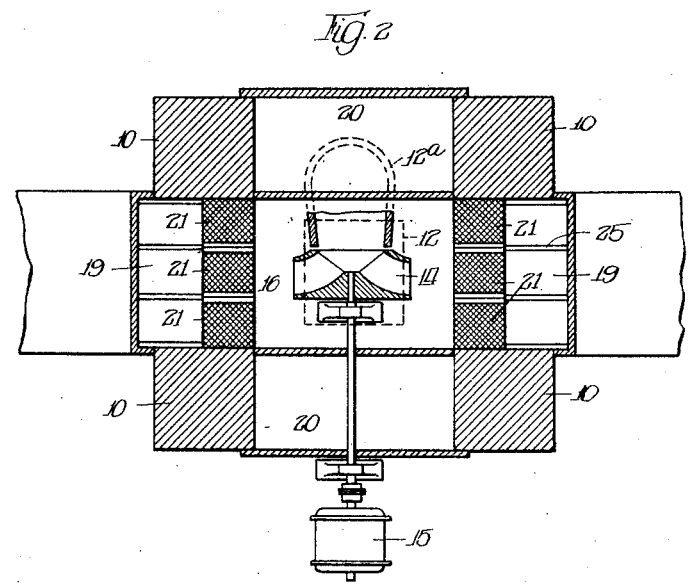

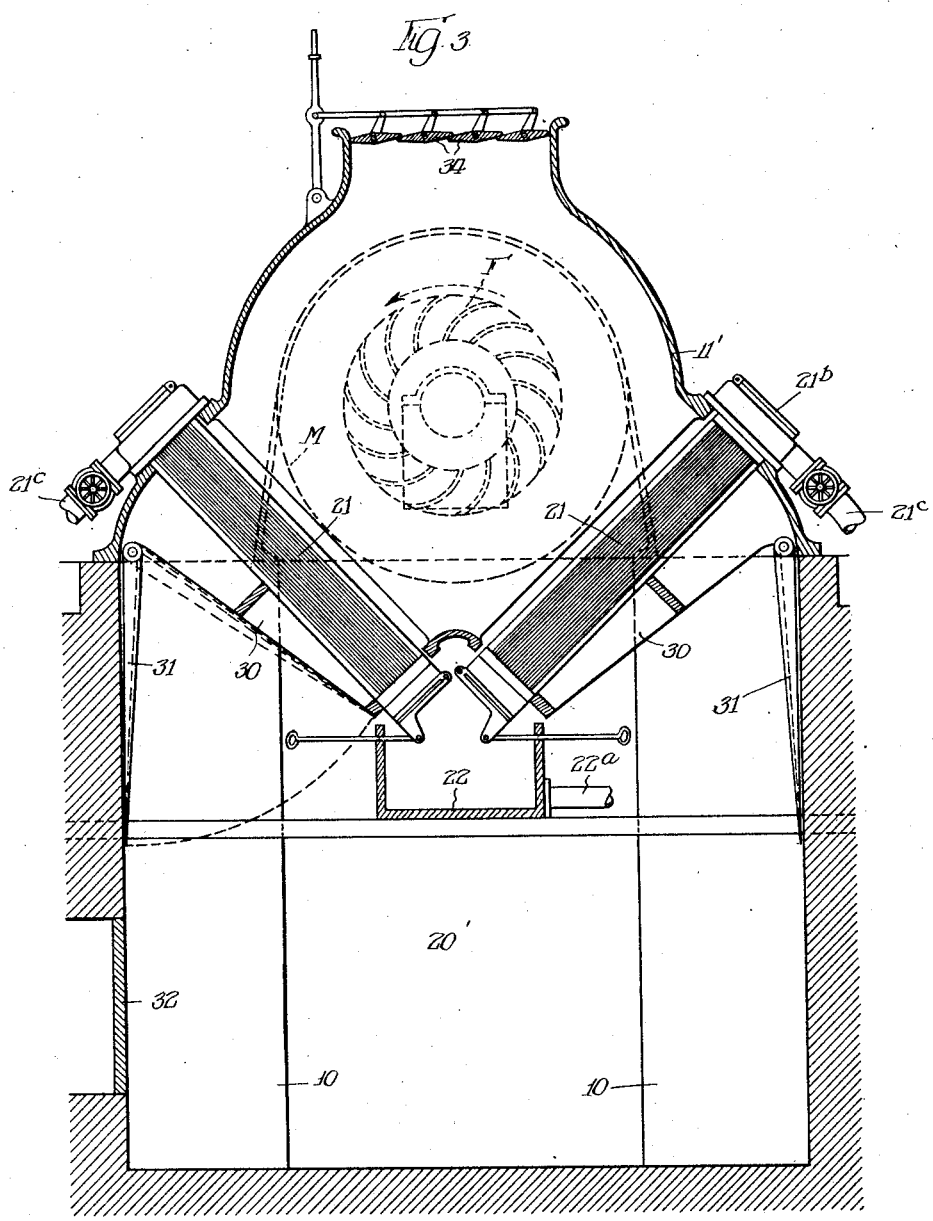

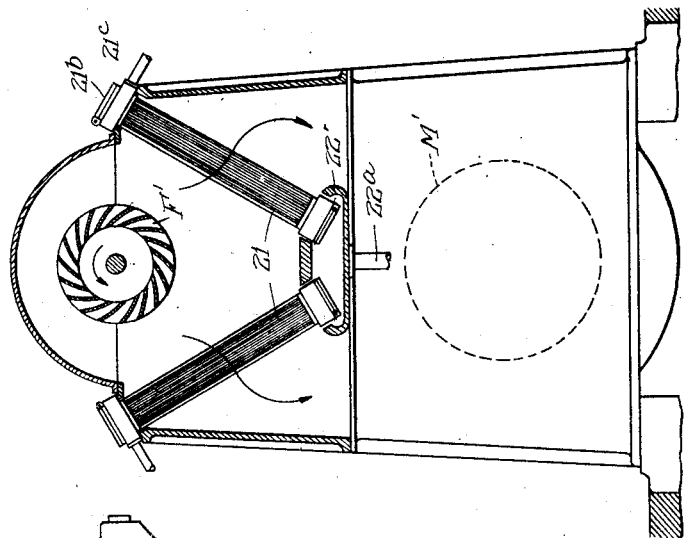
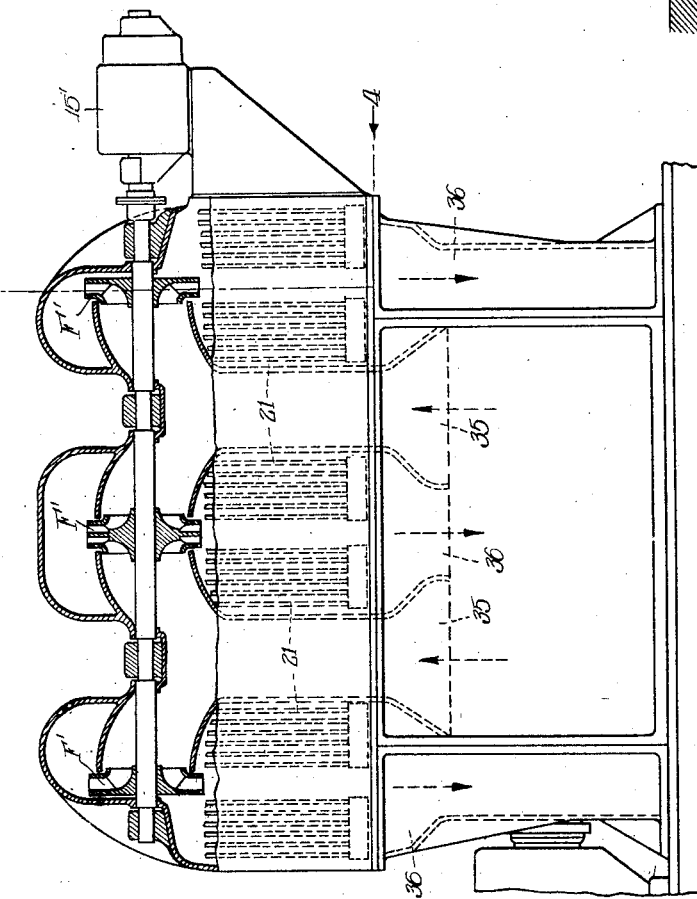

Patented Oct. 29, 1929

1,733,179

UNITED STATES PATENT OFFICE

ADOLPH BAUMANN, OF BADEN, SWITZERLAND, ASSIGNOR TO AKTIENGESELLSCHAFT BROWN BOVERI & CIE., OF BADEN, SWITZERLAND, A JOINT-STOCK COMPANY OF SWITZERLAND

COOLING APPARATUS FOR ELECTRICAL MACHINES

Application filed June 8, 1927, Serial No. 197,347, and in Germany June 28, 1926.

This invention relates to electrical apparatus, such as dynamo-electric machines, which it is desirable to cool in order to maintain them in proper operative condition. It finds particular utility in connection with large generators.

A general object of the invention is the provision of an improved construction and arrangement of cooling apparatus which may be installed in close association with the machine to be cooled, so as to occupy minimum space, which will afford large cooling capacity, and which can be maintained in proper operative condition without interfering with operation of the machine.

Another object is the provision of a construction and arrangement of cooling apparatus in intimate association with the cooled machine and which can be cleaned with facility, for removal of deposits and the like from the cooling water, without interfering with the operation of the machine.

Another object is the provision of such apparatus for a closed circuit cooling system, which occupies minimum space and at the same time affords ample cooling surface area and smooth and liberal flow for the air which constitutes the circulating cooling medium between the coolers and the machine.

Another object is the provision of such apparatus which contributes to simplification of the foundation arrangements by virture of a construction whereby the coolers may be supported in the casing or on the foundation piers of the cooled machine.

Other and further objects of the invention will be pointed out or indicated hereinafter, or will be apparent to one skilled in the art upon an understanding of the invention or its employment in practice.

In the accompanying drawings forming a part of this specification, I illustrate various forms in which the invention may be structurally embodied, but it is to be understood that these are presented for purpose of illustration only, and are not to be given any interpretation for limiting the claims short of the true and most comprehensive scope of the invention in the art.

In said drawings,

Fig. 1 is a diagrammatic illustration in the nature of a sectional elevation constituting a closed circuit cooling system for a generator, the casing of which is shown in end elevation;

Fig. 2 is a horizontal sectional view, as taken on approximately line 2—2 of Fig. 1;

Fig. 3 is a transverse sectional elevation of another arrangement, in which the coolers are mounted in the machine casing, the location of the generator and the air circulating fan being indicated in dotted lines;

Fig. 4 is a transverse sectional elevation of a third arrangement, in which the coolers are supported in the machine frame and above the generator, the location of which is indicated in dotted lines; and Fig. 5 is a side elevational view of such an arrangement, with the fans and fan casings shown in section.

The invention has to do with cooling systems of the closed circuit type in which the cooling air is circulated and re-circulated through the machine to be cooled and through coolers arranged in association therewith and through which water is circulated for the cooling of the air. In order to maintain the heat transfer efficiency of the coolers, it is necessary, from time to time, to clean them for the removal of sludge deposits or incrustations from the tubes through which the cooling water is circulated. The present invention provides for this being done with facility while the machine is in operation. Fans for circulating the air may be direct-connected on the shaft of the machine, or may be separately driven. The arrangement of the coolers, the fan and the machine is such that a very compact assembly is obtained and a very smooth and well distributed flow of air through the coolers is obtained, such as to give an ample supply of cooling air to the machine with minimum consumption of power for its circulation.

The nature of the invention will be ascertained in more detail by reference to the illustrative embodiments shown in the drawings. In that illustrated in Figs. 1 and 2, the reference numerals 10 designate the foundation piers upon which the generator and its casing 11 are supported. The machine casing is provided with the end hoods 11ᵃ through which the cooling air is introduced. The air passes from the machine into a conduit 12 which is open beneath it between the end hoods 11ᵃ. This conduit leads to a centrifugal fan 14 which is arranged below the machine and driven by a motor 15. This fan discharges into a central air compartment 16 which is closed at the top by a partition 17 and at the bottom by a partition 18 and communicates laterally with compartments 19 which latter are in communication, below the partition 18, with passages 20 which lead upwardly to the hoods 11ᵃ. The coolers 21 are arranged in synclinal relationship on opposite sides of the fan between the compartments 16 and 19. They comprise tubes arranged in parallel spaced relationship and connected at their ends with water heads 21ᵃ, which have covers 21ᵇ that may be opened to afford access to the tubes for cleaning. The upper water heads have connections 21ᶜ for inlet and outlet of the cooling water, said connections being arranged with quickly detachable couplings such as to permit their disconnection when it may be desired to remove the coolers. The lower water heads are disposed above a trough or receptacle 22 which is drained through an outlet 22ᵃ. The coolers are supported at their lower ends on rollers 24 which run on inclined rails 25, and at their upper ends by flanges or hooks 26 which engage suitable supports. The floor 27, on which the generator is arranged is provided with openings above the coolers, said openings being closed by removable covers 28. The coolers may be cleaned by opening the lower covers 21ᵇ, as indicated, to permit the water to discharge into the receptacle 22 and flush out the collected mud, and by opening the upper covers 21ᵇ to permit the tubes to be scraped with a jointed cleaning rod or by hydraulic cleaning devices. For purposes of inspection or repair, a cooler may be quickly removed by removing the floor plate 28 and uncoupling the water connections 21ᶜ, and then lifting out the cooler with the customary service crane. In this operation the cooler rides up the rails 25 until it reaches the vertical position shown in dotted lines at the left of the figure, and is then lifted out vertically. The cleaning with the cooler in place may be effected while the machine is in operation, and the coolers may be cleaned one at a time, thereby necessitating only partial reduction of the cooling capacity. Since flushing water is discharged outside the air path, it will have no deleterious effect.

In closed circuit cooling, the hot air from the machine is drawn through the conduit 12 to the fan 14, from which it is expelled into the chamber 16, whence it passes through the coolers into the chambers 19, and downwardly through the return conduits or passages 20 which lead upwardly to the hoods 11ᵃ. This provides a very smooth and spacious path for the air circulation, with liberal distribution of the air to the coolers. By the provision of conduits 27′ and 28′ and dampers 29, the installation may be adapted for either closed circuit operation or fresh air circulation. With the dampers in position shown in full lines, the apparatus will work on closed circuit, as above described. By shifting the dampers to positions shown in dotted lines, fresh air will be drawn in through conduits 28′ to compartments 20 and through the machine, and driven out through conduits 27′.

In the arrangement illustrated in Fig. 3, the coolers are supported in the base portion of the machine frame 11′ provided with sloping brackets 30 on which the coolers are supported in the synclinal relationship as above described. The location of the machine is here designated by the dotted lines M, and the fan, which is direct-connected on the machine shaft, by the dotted lines F. In this arrangement the warm air is expelled by the fan and passes through the coolers and then down to the lower opening of the return chamber 20′, through which it passes upwardly, back into the machine casing. The coolers are accessible for cleaning from the engine room floor without it being necessary to uncouple the water connections to the head boxes. Wet cleaning only slightly reduces the cooling capacity of the cooler being cleaned. Doors 31 are provided so that in event it becomes necessary to remove one of the coolers for inspection or repair, the air exit opening of such cooler may be closed, in order to prevent a short-circuited air flow. In order that the amount of air circulation be maintained at such a time, a door 32 may be opened to admit fresh air in an amount sufficient to afford adequate supply, and the dampers 34 opened to afford suitable outlet.

In the arrangement illustrated in Figs. 4 and 5, the fan F′ is supported in the upper portion of the machine casing, with the coolers 21 disposed in synclinal relationship at the sides thereof. The fan is separately driven by the motor 15′ and draws the warm air from the machine M′ through the conduits 35, returning it through the conduits 36. The coolers in this arrangement may be cleaned in the manner above described, the water being flushed into the conduit 22′ and discharged to the sewer by way of connection 22ᵃ. In Fig. 5, the positions of the coolers are indicated in part in dotted lines. This makes a very compact assembly which may be employed advantageously when the available space below the machine is too limited to accommodate the cooling apparatus.

What I claim is:

1. In apparatus of the character described, a dynamo electric machine having a casing provided with inlet and outlet openings for cooling fluid, cooling units supported in angular relationship with respect to each other in an upright V-shape formation, fluid-impelling means disposed substantially within the V of such formation and being operable to induce the flow of cooling fluid toward said units; and means including said machine casing and embracing said units and said fluid-impelling means and providing a closed circulation path for the cooling fluid wherein the same is caused upon operation of said fluid-impelling means to flow from said machine casing by way of said outlet opening thereof, thence through said fluid-impelling means, thence in substantially opposite directions through the respective cooling units, and thence into said machine casing by way of said inlet opening thereof.

2. In apparatus of the character described, a dynamo electric machine, and elongated fluid-cooling unit therefor, means supporting said unit with its longitudinal axis angularly disposed with respect to the vertical and for bodily upward movement upon application to the upper end portion of said unit of an upwardly-directed force, and means operable upon such bodily upward movement of said unit to provide for simultaneous tilting movement of the same such as to effect substantial coincidence of its longitudinal axis with the vertical.

3. In apparatus of the character described, a dynamo electric machine, an elongated fluid-cooling unit therefor, means supporting said unit with its longitudinal axis angularly disposed with respect to the vertical and for bodily upward movement upon application to the upper end portion of said unit of an upwardly-directed force, and means forming part of said supporting means and being operable upon such bodily upward movement of said unit to provide for simultaneous tilting movement of the same such as to effect substantial coincidence of its longitudinal axis with the vertical.

In testimony whereof I have hereunto subscribed my name this 20 day of May, A. D. 1927, at Zurich, Switzerland.

ADOLPH BAUMANN.